United States Patent
Merza

(10) Patent No.: US 9,248,068 B2
(45) Date of Patent: *Feb. 2, 2016

(54) SECURITY THREAT DETECTION OF NEWLY REGISTERED DOMAINS

(71) Applicant: Splunk Inc., San Francisco, CA (US)

(72) Inventor: Munawar Monzy Merza, Albuquerque, NM (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,023

(22) Filed: Jul. 28, 2014

(65) Prior Publication Data
US 2015/0033333 A1    Jan. 29, 2015

Related U.S. Application Data

(63) Continuation of application No. 13/956,262, filed on Jul. 31, 2013, now Pat. No. 8,826,434.

(60) Provisional application No. 61/858,506, filed on Jul. 25, 2013.

(51) Int. Cl.
| | |
|---|---|
| *H04L 29/06* | (2006.01) |
| *A61G 17/007* | (2006.01) |
| *G06F 21/50* | (2013.01) |
| *G06T 11/20* | (2006.01) |
| *A61G 17/04* | (2006.01) |
| *H04L 29/12* | (2006.01) |

(52) U.S. Cl.
CPC ............ *A61G 17/0073* (2013.01); *A61G 17/04* (2013.01); *G06F 21/50* (2013.01); *G06T 11/206* (2013.01); *H04L 63/1416* (2013.01); *H04L 63/1441* (2013.01); *A61G 2017/041* (2013.01); *A61G 2017/042* (2013.01); *A61G 2017/044* (2013.01); *H04L 61/1511* (2013.01)

(58) Field of Classification Search
CPC . H04L 63/14; H04L 63/1408; H04L 61/1511; H04L 2463/144; H04L 2463/00; G06F 21/554; G06F 21/56; G06F 21/566
See application file for complete search history.

(56) References Cited

U.S. PATENT DOCUMENTS

| | | | |
|---|---|---|---|
| 2010/0037314 A1* | 2/2010 | Perdisci et al. | 726/22 |
| 2013/0097699 A1* | 4/2013 | Balupari et al. | 726/22 |
| 2013/0342538 A1 | 12/2013 | Kozine et al. | |
| 2015/0033332 A1 | 1/2015 | Merza | |

* cited by examiner

*Primary Examiner* — Izunna Okeke
(74) *Attorney, Agent, or Firm* — Wong & Rees LLP; Kirk D. Wong

(57) ABSTRACT

Domain names are determined for each computational event in a set, each event detailing requests or posts of webpages. A number of events or accesses associated with each domain name within a time period is determined. A registrar is further queried to determine when the domain name was registered. An object is generated that includes a representation of the access count and an age since registration for each domain names. A client can interact with the object to explore representations of domain names associated with high access counts and recent registrations. Upon determining that a given domain name is suspicious, a rule can be generated to block access to the domain name.

30 Claims, 13 Drawing Sheets

SECURITY THREAT DETECTION OF NEWLY REGISTERED DOMAINS

CROSS-REFERENCE OF RELATED APPLICATIONS

This application claims benefit as a Continuation of application Ser. No. 13/956,262, filed Jul. 31, 2013, which claims benefit of U.S. Provisional Application No. 61/858,506, filed on Jul. 25, 2013, the entire contents of the aforementioned are hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates generally to computer-implemented systems and methods for assisting in the detection of security threats by comparing a number of times that a domain name is accessed to an age since the domain name was registered with a registrar.

BACKGROUND

Electronic communications across networks are becoming pronounced features in the business personal worlds. However, such communication also exposed systems to security threats. Hackers are developing increasingly sophisticated techniques for infiltrating computational systems in gaining access to confidential information. For a given technique, a rule can often be developed to prevent execution of the technique.

Frequently, though, hackers can recognize the developed rule and adjust the technique. Further, it can be difficult to identify a rule that positively targets actual threats yet allows desirable or internal functions to continue to operate appropriately. Therefore, many computational systems continue to remain exposed to security threats, and improved security techniques are needed to provide computational security.

SUMMARY

In accordance with the teachings provided herein, systems and methods are provided for determining and evaluating a domain name from each electronic event in a set of events. The events can include those characterizing a computer action and/or communication (sent or received over a network), such as a request for or post of a webpage. Thus, an event can include a universal resource locator (URL) corresponding to the webpage, which can be used to identify a domain name for the webpage. For each domain name, a count can indicate how many times a request was sent or a post was made (e.g., a webpage was "accessed") for an associated webpage. Further, a query can be sent to a registrar to determine when the domain name was registered. Domain names with recent registration times and high access counts may suggest a potential security threat is present.

An object can present, for each of a set of domain names, a representation of the access count and an age since registration. A client viewing the object can then detect domain names departing from the normal patterns between the variables. A client can select an individual domain-name representation, which can cause more detail to be shown regarding events tied to the domain name. A client can also initiate generation of a rule that can, e.g., block access to the domain name. Thus, techniques can benefit from the processing of a large number of computational events and webpage-access data to identify domain names associated with unusual access patterns. Further, strict rules subject to malware adaptability can be avoided in favor of providing clients with the power to easily view access data and identify appropriate reactions.

In some embodiments, a computer-implemented method is provided. A set of events is received. A set of accessed domain names is determined. Each accessed domain name in the set of accessed domain names is included in a corresponding event in the set of events. Each accessed domain name in the set of accessed domain names serves an accessed webpage. A time for each accessed domain name in the set of accessed domain names is identified. The time is indicative of when the domain name was registered with a registrar or when the domain name was first detected within the set of events. An accessed domain name in the set of accessed domain names is identified for which the identified time is recent relative to times for other accessed domain names in the set of accessed domain names. A number of events is determined for the identified domain name that include the accessed domain name. An object is generated. Generating the object is based on the number of events or the object represents the number of events.

Also provided, in some embodiments, is a system including one or more data processors; and a non-transitory computer readable storage medium containing instructions which when executed on the one or more data processors, cause the one or more processors to perform the method. Further provided, in some embodiments, is computer-program product tangibly embodied in a non-transitory machine-readable storage medium, including instructions configured to cause one or more data processors to perform the method.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The present disclosure is described in conjunction with the appended figures:

FIGS. 8A-8D show examples of objects representing access counts and registration times;

FIG. 9 shows an example of an object with expanded detail relating to a selected domain name.

Like reference numbers and designations in the various drawings indicate like elements.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
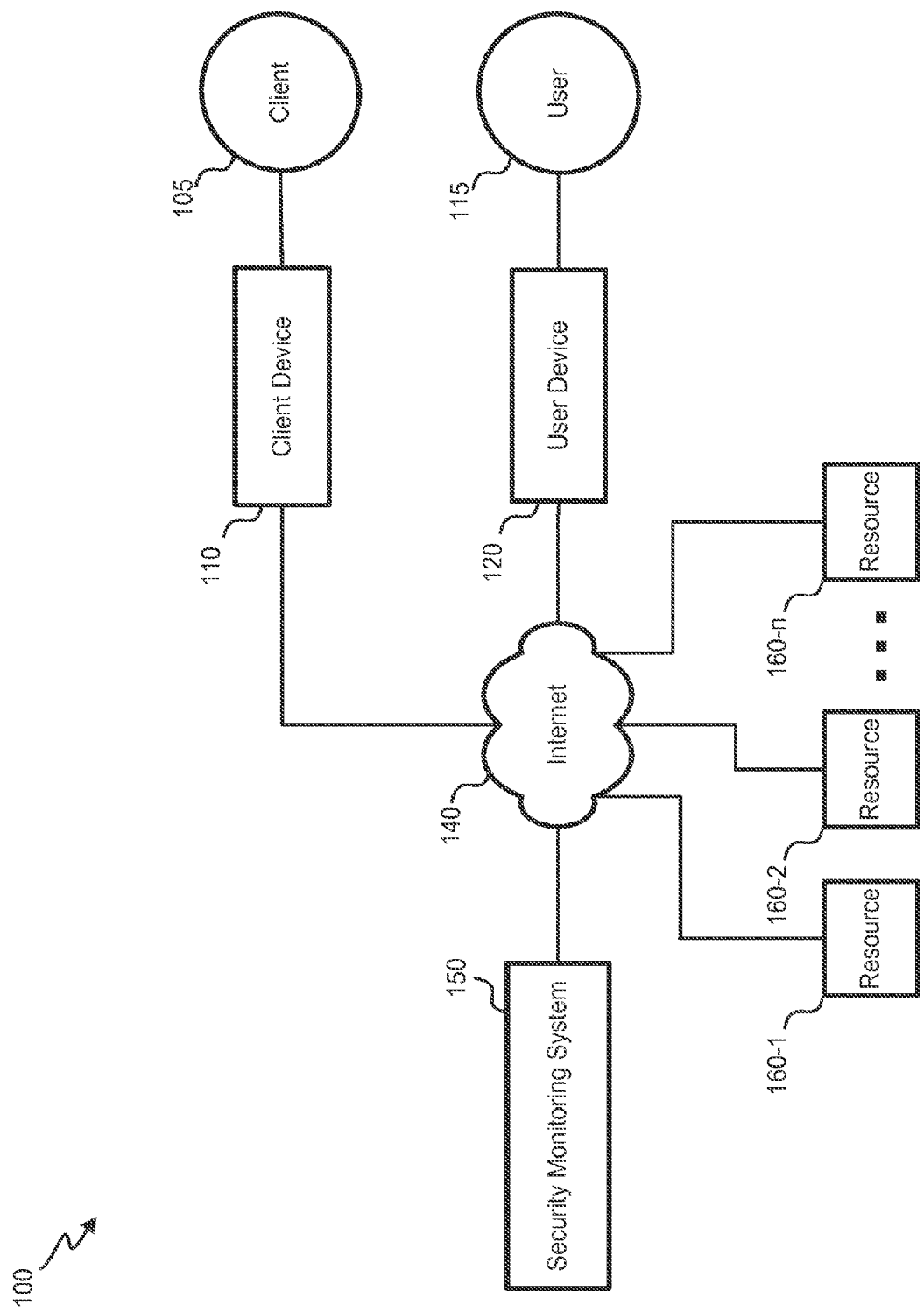
FIG. 1 shows a block diagram of an embodiment of an security-monitoring interaction system.

Referring first to FIG. 1, a block diagram of an embodiment of a security monitoring interaction system 100 is shown. A client 105 and/or user 115 can interact with a security monitoring system 150 via respective devices 110 and/or 120 and a network 140, such as the Internet, a wide area network (WAN), local area network (LAN) or other backbone. It will be understood that, although only one client 105 and user 115 are shown, system 100 can include multiple clients 105 and/or users 115.

Client device 110 and/or user device 120 can each be a single electronic device, such as a hand-held electronic device (e.g., a smartphone). It will be understood that client device 110 and/or user device 120 can also include a system that includes multiple devices and/or components. The device(s) 110 and/or 120 can comprise a computer, such as the desktop computer, a laptop computer or a tablet. In some instances, a party 105 and/or 115 uses different devices at different times to interact with security monitoring system 150.

Security monitoring system 150 provides client 105 with tools to access indicators of potential security threats. Specifically, security monitoring system 150 can collect data from one or more resources 160, process the data (e.g., internally and/or using one or more resources) to identify events in the data (e.g., webpage requests or logs), determine accessed universal resource locators (URLs) based on the events, and count a number of times each URL was accessed. A resource from which data is collected can include, e.g., a server, a router and/or a user device 120. The events can pertain to users' access to webpages over network 140. In some instances, client 105 maintains, controls and/or operates a network system that supports online activity of user 115.

Security monitoring system 150 can then determine when one or more domain names were registered with a registrar (e.g., by requesting the information from one or more registries). Access counts can be compared (e.g., via a graph or table) to age since registration across domain names. A client can review the comparison (e.g., by viewing an object on client device 110) and identify suspicious domain names for which the domain name was recently registered but the domain was nonetheless accessed many times. Client 105 can interact security monitoring system 150 to generate one or more rules that can block access to specific domains or can that cause an alert to be sent upon detecting attempted access to the domain.

Figure 2:
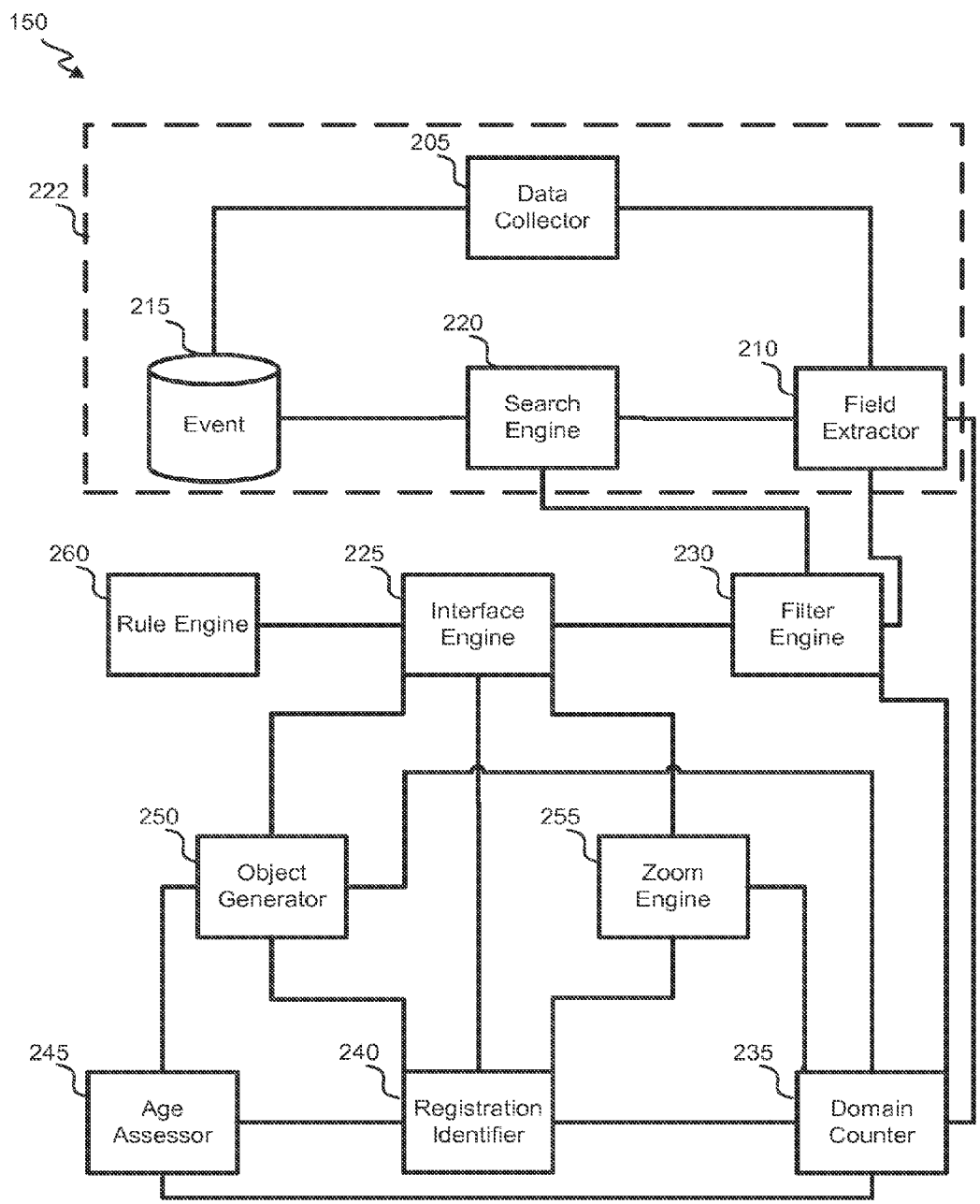
FIG. 2 shows a block diagram of an embodiment of security monitoring system.

Referring next to FIG. 2, a block diagram of an embodiment of security monitoring system 150 is shown. Security monitoring system 150 can be, in part or in its entirety, in a cloud. In some instances, at least part of security monitoring system 150 is present on a device, such as a client device 110. In some instances, various components in security monitoring system 150 are present in one or more resources. For example, event data store 315 can be stored on resource 160-1, and interface engine 225 can operate on resource 160-2. Thus, security monitoring system 150 can include a distributed system.

A data collector 205 collects data from one or more resources 160. The data can include unstructured data, structured data and/or machine data. The data can include data from web logs and/or can pertain to web access. Discrete events can be present within the data. These events can include HTTP requests and/or traffic logs. As will be described in further detail herein, the collected data can be segmented into the events and particular values can then be extracted from the events.

Initially, and as further detailed below, a field extractor 210 extracts a timestamp from each event. Based on the timestamp, data collector 205 stores each event in an appropriate index in an event data store 215.

A search engine 220 can then retrieve select events pertinent to a particular analysis at hand. For example, a particular time period can be identified based on, e.g., input originating from a client and received via an interface engine 225. Events with timestamps within the time period can then be retrieved by search engine 220 from event data store 215. Data collector 205, field extractor 210, event data store 215 and search engine 220 can be part of a data management system 222, described in further detail in reference to FIG. 3 below.

An additional retrieval variable can also be retrieved. For example, for a particular department in a company, a client may be only interested in webpages requested (irrespective of what was posted) or the converse. A filter engine 230 can then generate a filter indicating which types of events to retrieve (e.g., "GET" or "POST" events). As another example, a client may only be authorized to view events pertaining to actions from select users (e.g., users within a client's company). Filter engine 230 can then generate a filter appropriately, which may involve specifying a field value identifying an organization (e.g., employer) or a list of user-device identifiers.

A data aggregator 235 identifies which value is to be extracted from the retrieved events. The extracted value can include one useful to determine a domain name and can include a URL. Other values not used to determine the domain name can also be extracted from events by field extractor 210. For example, a timestamp can be extracted to indicate when particular webpage accesses occurred, an IP address can be extracted to indicate where events with particular webpage posts or requests originated, etc.

Following the data aggregator's determination as to which values are to be extracted from events, field extractor 210 extracts the appropriate values and returns them to data aggregator 235. Data aggregator 235 performs any requisite processing on the values. In one instance, data aggregator 235 defines the domain name as being a substring within a URL string. The substring can be determined based on, e.g., domain-name punctuation characteristics, known domain-name extensions or other patterns. For example, a domain name may be defined as the URL through the extension or through a second period until a next punctuation character.

In some instances, more events are retrieved by search engine 220 than are to be used for a particular analysis. For example, all web access events within a particular time period are retrieved, and then only a subset having a particular HTTP method value (e.g., "GET" or "POST") are further analyzed. In such situations, filter engine 230 can generate (which can include retrieving) a filter that can isolate events that are to contribute to the analysis. Data aggregator 235 can then apply the filter, such that each event in a set of events remaining after the filter application is to be included in the analysis. In one instance, the filter is applied by analyzing values in the data structure (e.g., indicating an HTTP method type). In one instance, data aggregator 235 requests that field extractor 210 return to the retrieved events and extract the pertinent value.

Data aggregator 235 can then generate a data structure that includes an element for each event in a set of events, each element identifying a domain name and a corresponding event identifier. The domain names in the data structure make up a set of domain names that corresponds to the set of events. The data structure can further include, in each element, other pertinent values, such as an event's timestamp (e.g., which can be equated to a time of access to a domain name).

Events pertaining to a particular analysis can be clustered into a set of events. The set of events can include those, e.g., with a timestamp within a defined absolute or relative time period and/or associated with one or more specific client networks or user devices. A corresponding set of domain names can include, for each event in a set of events, a domain name determined based on the event.

Using the set, domain counter 235 counts how many events in the set of events are associated with a particular domain name. Thus, e.g., if a set of events are those events received within the past 24 hours, domain counter 235 could estimate a number of accesses to a domain name by counting how many events with timestamps in the past 24 hours included a URL based on the domain name. Domain counter 235 can store a data structure associating individual domain names with access counts. In some instances, the data structure associates individual domain names with a list of access times, such that a count can be dynamically updated for relative time periods without needing to return to the events.

A registration identifier 240 determines, for one or more of the domain names in the set of domain names, when the domain name was registered with a registrar. In some instances, this determination is performed for all domain names in the set. In others, it is only performed for domain names not previously detected by security monitoring system 150, domain names corresponding to a large number of events, or domain names not present in a cache associating domain names with a registration time.

Registration identifier 240 can determine a registration time by sending a query to a registrar, such as Internet Corporation for Assigned Names and Numbers. The query can include the domain name and a registration type of interest. The registrar can respond with a time (including the date) of the registration. Registration identifier 240 can associate the domain name with the registration time in a data structure (e.g., a same one used associate domain names with access counts or a different one). Subsequently, registration identifier 240 can benefit from the data structure by being able to pull a registration time without querying an external registrar.

An age assessor 245 can analyze the population of access counts and registration times to determine which combinations of these variables are most common. Age assessor 245 can use statistics or a model (e.g., using a Bayesian or clustering technique) to determine which data points are unexpected based on normal usage patterns, which may then be identified as a potential security threat.

An object generator 250 can receive one or more data structures identifying access counts and registration-time information for domain names and generate an object representing the data. The object may represent the entire set of analyzed domain names, the subset of domain names or those that domain names identified as being associated with unexpected access counts given the registration times. The object can represent, for each domain name, an access count and an age since registration. In some instances, a mere inclusion of a data point representing a domain name in the object is indicative of an access count (e.g., being above a threshold) and/or a registration age. Inclusion of representations of domain names with seemingly normal access counts given a registration age can allow a client viewing the object to gain an understanding as to normal variable dependency in order to assist in detection of anomalous data.

The object can be a visual representation of data; for example, the object can include a table, chart, graph or figure. In one instance, a scatter plot includes points based on registration ages and counts. In one instance, a table includes rows, each representing a unique domain number. Each row can include the registration age and a count of a number of events indicating access to the domain name within a time period.

The object can be interactive, allowing a client to click on object elements (e.g., points in a scatter plot, bars in a histogram, or rows or values in a table). Clicking on a particular element can cause more detail to be shown pertaining to events contributing to the element. In another instance, a client can click on more general zoom elements, thereby indicating a request to enhance or mitigate a level of detail. In some instances, the interaction can indicate a request for data not currently available to object generator 250. In these instances, interface engine 225 can alert zoom engine 255 of the interaction. Zoom engine 255 can then communicate with appropriate elements of security monitoring system 150 (e.g., data aggregator 235, registration identifier 240 and age assessor 245 (connection not shown)) to aggregate and analyze the appropriate data, and the object can be appropriately updated. This interactive approach can allow a client to investigate domain-name accesses that he believes to be most concerning. If detailed analysis reveals that his intuition is incorrect, he can easily navigate to a higher-level view to investigate any other interesting data points.

Thus, security monitoring system 150 can avoid the application of rigid and fixed rules to generate security-threat alerts or to block behavior and instead relies on client evaluation and experience to identify actually concerning domain-name access patterns. This can be particularly advantageous in the security field, where security threats repeatedly evolve in technique and style, and malware programmers can repeatedly register new domain names to avoid detection.

Once a client determines that data pertaining to a domain name is concerning, he can cause interface engine 225 to respond to a presence of the domain name in future events in a desired way (e.g., being ignored or denied). Interface engine 225 can present the option to initiate a rule, receive relevant input (e.g., corresponding to an identification of a concerning domain name and a consequence), and relay the input to a rule engine 260. Rule engine 260 can then generate the rule. Rule engine 260 can cause real-time events to be monitored for a presence of an identified domain name and, upon detection of the domain name, execute the rule.

Security monitoring system 150 can perform data collection and analyze and object updating in real-time (e.g., a "last 24-hour period") or for a static time window (e.g., "Jul. 10, 2013"). For a real-time situation, an object presented can change as new data is collected.

Figure 3:
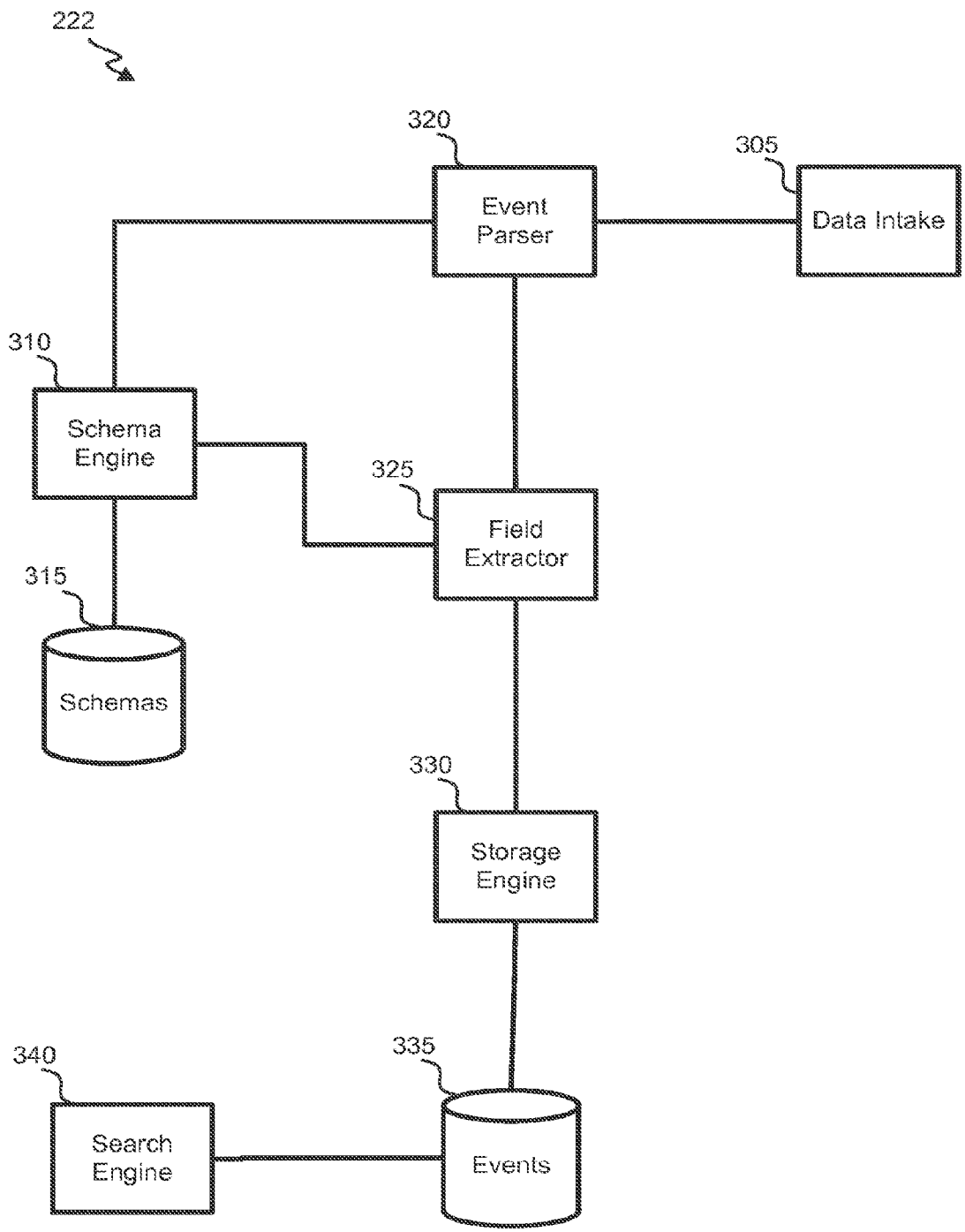
FIG. 3 shows a block diagram of an embodiment of a data management system.

FIG. 3 shows a block diagram of an embodiment of a data management system 222. Data intake 305 receives data, e.g., from a data provider, client, or user. The data can include automatically collected data, data uploaded by users, or data provided by the data provider directly. In some instances, the data includes a structure that allows for individual events and field values within the events to be easily identified. The structure can be predefined and/or identified within the data. For example, various strings or characters can separate and/or identify fields. As another example, field values can be arranged within a multi-dimensional structure, such as a table. In some instances, data partly or completely lacks an explicit structure. For example, in some instances, no structure for the data is present when the data is received and instead is generated later. The data may include a continuous data stream can include multiple events, each with multiple field values.

A schema engine 310 identifies an applicable schema that can be used to extract specific field values by imposing structure on data. Specifically, a schema can be "bound" to data, by breaking a data stream (e.g., a byte stream) into events and/or extracting field values, such as a time stamp. Schema binding can occur while receiving data, prior to storing data, while storing data, while processing data, while retrieving data, while responding to a search query or some combination of the above (e.g., separating data into events at intake and extracting field values from events while responding to a search query). Late binding schema can be used, which imposes structure on the data at query time rather than at storage or ingestion time.

Schema engine 410 can itself estimate a schema or can determine a schema based on input from a client or data provider. The input can include the entire schema or restrictions or identifications that can be used to estimate or determine a full schema. Such input can be received to identify a schema for use either with structured or unstructured data and can be used to reliably extract field values. The schema can be estimated based on patterns in the data (e.g., patterns of characters or breaks in the data) or headers or tags identifying various fields in the data, such as <event><message time>2014.01.05.06.59.59</> . . . </>). Schema can be received or estimated in a variety times, including (in some instances) any time between receipt or indexing of the data and a query time. The time that the schema is actually received or estimated within the receipt-to-indexing time period may be determined based on a setting or system load. Schema engine 410 can perform the schema estimation once or multiple times (e.g., continuously or at routine intervals). Once a schema is determined, it can be modified (e.g., periodically, at regular times or intervals, upon receiving modification-requesting input, upon detecting a new or changed pattern in the input, or upon detecting suspicious extracted field values (e.g., being of an inconsistent data type, such as strings instead of previously extracted integers)). In some instances, a client or data provider can provide input indicating a satisfaction with or correction to estimated schema. Received or estimated schemas are stored in a schema data store 415

Using the schema, an event parser 320 can separate the received data into events. For example, event parser 320 can separate data between particular start and stop tags, or separate data within a table's row, or separate data within particular character numbers in the data. Also using the schema, a field extractor 325 can extract various field values. In some instances, field extractor 325 further attaches a semantic meaning to the extracted field values (e.g., based on a length and/or character types of the field values). Field extractor 325 can further convert field values into a particular (e.g., standard or easily searchable) format.

It is noted that data collector 205 from system 200 can largely parallel the combination of data intake 305 and event parser 320. While system 200 does not explicitly show schema engine 310 and schema data store 315, it will be appreciated that system 200 can include these elements, which can then be utilized by data collector 205 and field extractor 210.

A storage engine 330 can store data in an event data store 335, which can correspond to event data store 215. It will be appreciated that event data store 335 can include multiple data stores or sub-data stores. Event data store 335 can be stored in working, short-term and/or long-term memory. In various instances, event data store 335 can include raw data, extracted events or extracted field values. It will be appreciated that, in some instances, part of the data received by data intake 305 can be deleted or not stored (e.g., field breaks).

Events and/or field values can be stored at locations based on a field value. For example, a field value identifying a message sender may be stored in one of ten data stores, the data store being chosen based on a message time. In some instances, rather than grouping various data components at specific storage areas, event data store 435 includes an index that tracks identifiers of events and/or fields and identifiers of field values. Thus, for example, the index can include an element for "Data type="webpage request" (indicating that the element refers to a field value of "webpage request" for the field "data type") and then list identifiers for events with the field value (e.g., "Events 3, 7, 9 and 16"). Selective storage grouping can be referred to as storing data in "buckets". Bucket definitions can be fixed or defined based on input from a data provider, client or client. Input and/or automatic rules can be used to add, merge or delete buckets.

In some instances, a time-series data store is used, such that events and/or field values are stored at locations based on a timestamp extracted from the events. This can allow events with recent timestamps (e.g., which may have a higher likelihood of being accessed) to be stored at preferable memory locations that lend to quicker subsequent retrieval. Further, parallel processing can then be performed, with each process operating on a different time bucket.

A search engine 340 (which can correspond to search engine 220) can subsequently access and search all or part of event data store. The search can be performed upon receiving a search query from a client, user or client, or the search can be performed periodically and/or at defined intervals or times. Segregation of data into events and/or fields can allow for more efficient searching. The search may include, e.g., a request to return all events or identifiers of all events having a value for a field meeting a criterion. To illustrate, search engine 340 can retrieve all events having a timestamp within a defined time period, or all events having a first field value (e.g., HTTP method) set to a specified value (e.g., GET).

The search may include, e.g., a request to return values for one or more first fields for all events having specified values (e.g., specific values or values within a specific range) for one or more second fields. To illustrate, search engine 340 can retrieve all URLs in events having a timestamp within a defined time period, or all events having a first field value (e.g., HTTP method) set to a specified value (e.g., GET).

In some instances, upon retrieving the event data of interest, search engine 340 may further process the results. The processing may be performed based on an individual value (e.g., to obtain a length or determine if an extracted field value matches a specified value). In some instances, processing can be performed across values, e.g., to determine an average, frequency, count or other statistic. Search engine 340 can return the search result to the client or user, e.g., via an interface (such as a web interface or app interface) or email.

Figure 4:
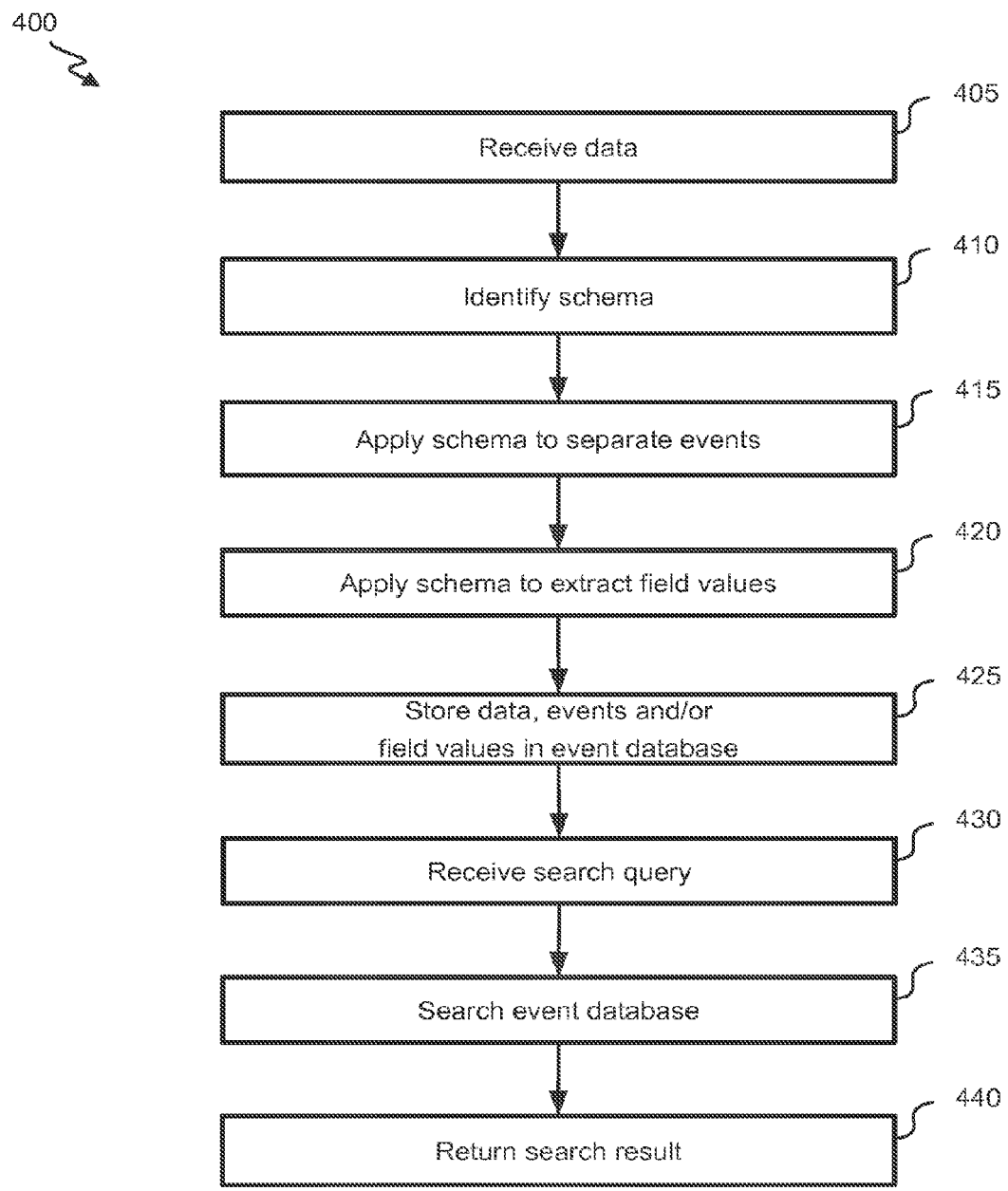
FIG. 4 illustrates a flowchart of an embodiment of a process for storing and using big data.

FIG. 4 illustrates a flowchart of an embodiment of a process 400 for storing and using big data. Process 400 begins at block 405, where data intake 305 receives data. Schema engine 310 identifies an applicable schema at block 410. Event parser 320 applies the schema to separate the data into events at block 415. Field extractor 325 applies the schema to extract field values from the events at block 420. Storage engine 330 stores raw data, events and/or field values in event data store 335 (e.g., by assigning the data, events and/or field values to buckets based on particular field values) at block 425.

Search engine 340 receives a search query from a searcher (e.g., client or user) at block 430. The search query can include one or more criteria which can specify or constrain field values. Search engine 340 searches event data store 335 at block 435. The search can entail searching only some of event data store 335 (e.g., that include field values of interest). The search can produce identifiers of events of interest. Search engine 340 may then collect other field values for those events of interest. A search result can include the collected other field values and/or a processed version thereof. Search engine 340 returns the search result to the searcher at block 340.

It will be appreciated that system 222 and/or process 400 can be modified such that schema is not bound to data (or only a portion of the schema is bound to data) immediately following intake. For example, schema could instead be bound prior to or during storage of the data or at a query time (e.g., subsequent to block 430 of process 400).

Data management system 222 and/or process 400 can be modified to include features, feature connections and/or flows as described in Carasso, David. *Exploring Splunk Search Processing Language (SPL) Primer and Cookbook*. New York: CITO Research, 2012 and/or as described in Ledion Bitincka, Archana Ganapathi, Stephen Sorkin, and Steve Zhang. *Optimizing data analysis with a semi-structured time series database*. In SLAML, 2010. Each of these references is hereby incorporated by reference in its entirety for all purposes.

Figure 5:
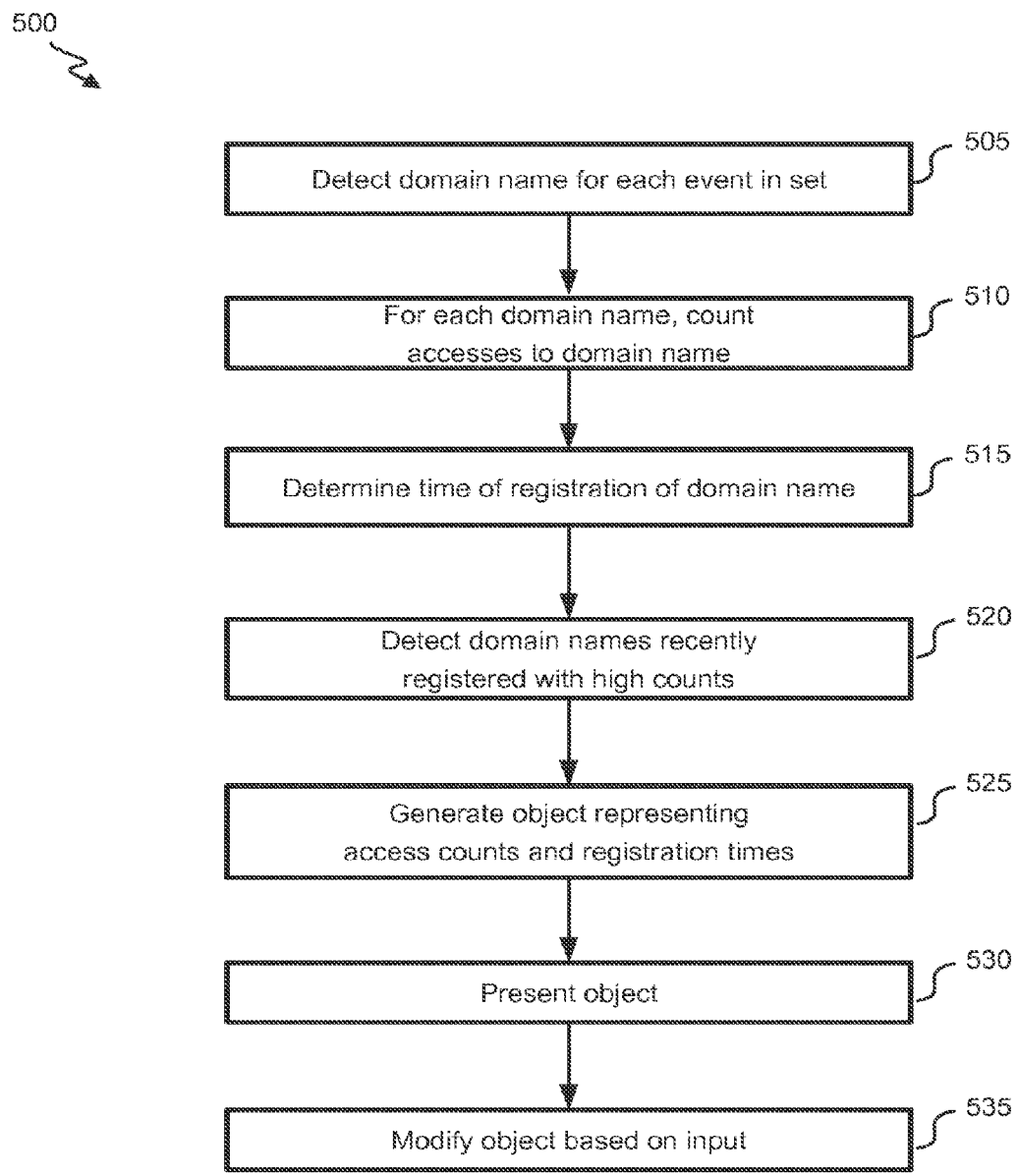
FIG. 5 illustrates a flowchart of an embodiment of a process for detecting potential security threats based on registration times of accessed domain names.

FIG. 5 illustrates a flowchart of an embodiment of a process 500 for detecting potential security threats based on registration times of accessed domain names. Process 500 begins at block 505, where domain counter 235 detects, for each event in a set of events, a domain name associated with the event. In some instances, field extractor 210 extracts the domain name from the event and transmits the domain name to domain counter 235. In some instances, field extractor 210 extracts another variable from the event that can be used to determine the domain name, field extractor 210 transmits the variable to domain counter 235, and domain counter determines the domain name. In one instance, field extractor 210 extracts a URL. Domain counter 235 can then scan for a punctuation signature, such as a second or last period in the URL, and the domain name can be set as the URL string from the beginning of the URL until a next punctuation character following the punctuation signature. As another example, domain counter 235 can scan for an extension (e.g., ".com", ".net", or ".org"), and set the domain name as being the string from the beginning of the URL through the extension. Domain counter 235 may determine a domain in a manner to ensure that all determined domains are at a same level (e.g., a top-level domain) or may not include such restriction.

Figure 6A:
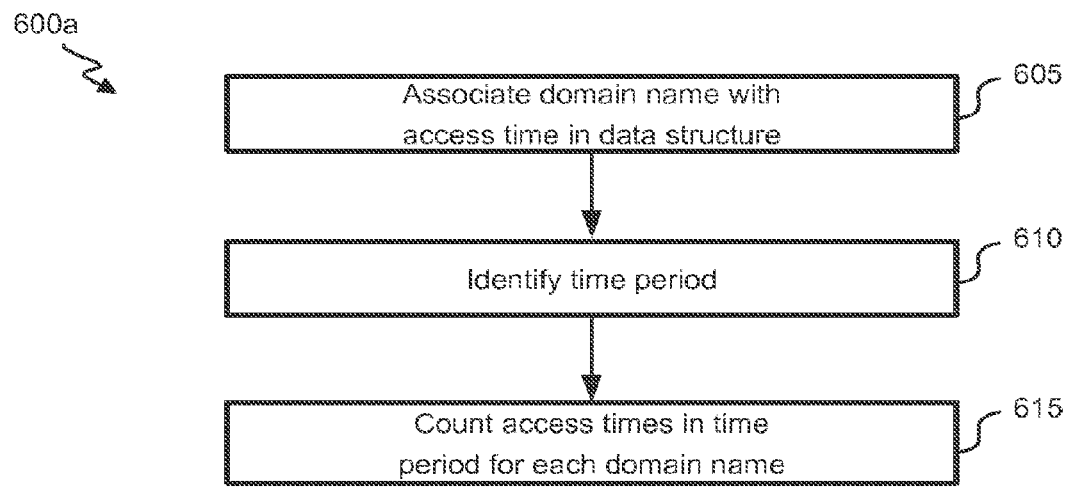
FIGS. 6A and 6B illustrate flowcharts of embodiments of processes for determining access counts.
Figure 6B:
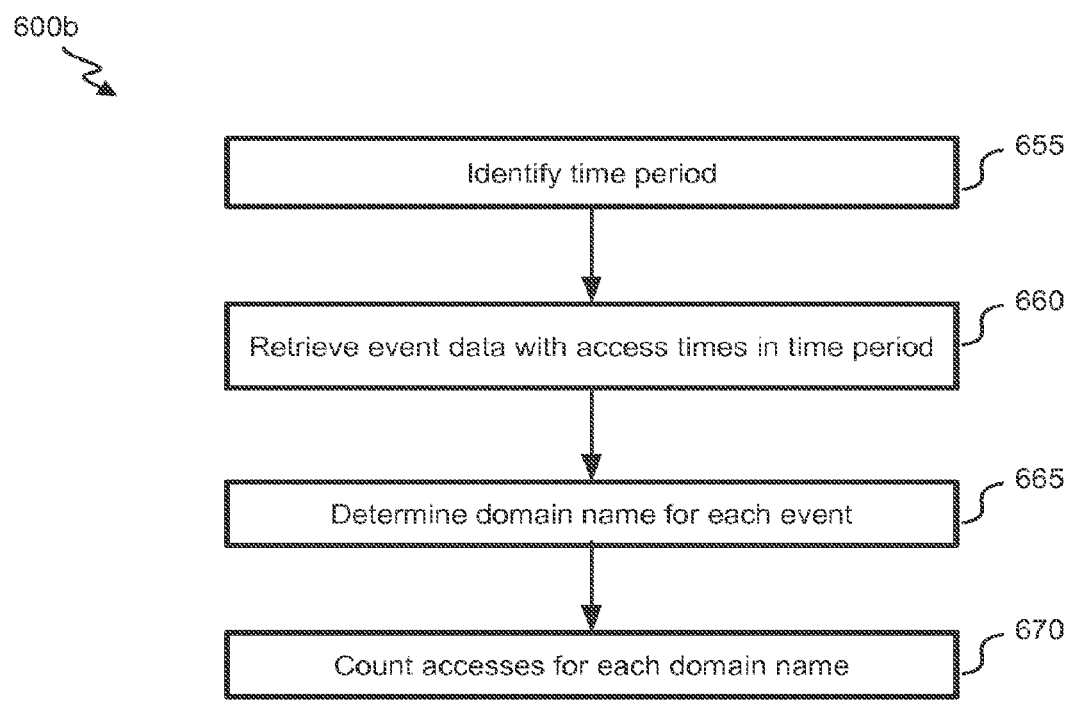

For each domain name, domain counter 235 counts how many times the domain name was accessed at block 510. The count can be calculated based on a particular time period. FIGS. 6A and 6B illustrate flowcharts of embodiments of processes 600a and 600b for determining access counts. In process 600a, domain counter 235 associates domain names with access times in a data structure. For example, domain counter 235 may detect each appropriate event (e.g., associated with a client and/or being of an appropriate "GET" or "POST" type) and (e.g., in real-time) may update the data structure to reflect the event by locating an element (e.g., a row) in the data structure associated with the domain name and adding an access time to the element. The access time can be a timestamp of the event, a time identified within the event and/or a time of receipt of the event.

Domain counter 235 identifies a time period at block 610. The time period can include an absolute time period (e.g., Jun. 15, 2013 through Jul. 14, 2013) or a relative time period (e.g., last 30 days). The time period can be fixed or determined based on input corresponding to a definition of the time period (e.g., selecting between "last week", "last two weeks" or "last month"). For relative time periods, block 610 can include converting the time period to absolute times based on a current time. Using the data structure, domain counter 235 can then count how many access times are within the time period for each domain name at block 615.

Process 600a thus illustrates a technique where domain names can be determined for each event as it is received, and a data structure mapping the domain names to access times can be maintained and used to subsequently summarize domain-name-specific access counts. In process 600b, domain names are determined at a query time rather than an intake time. Block 655 in process 600b can parallel block 610 in process 600a.

In process 600b, domain counter 235 retrieves data from some or all events with access times in the identified time period. A timestamp (e.g., included in an event), a receipt time, or an explicit access time can be used as an access time. In one instance, events are indexed based on associated timestamps, and timestamps are used as access times. Domain counter 235 can then identify events with timestamps in the time period and analyze those events appropriately. In some instances, events are further indexed based on another characteristic (e.g., an extracted HTTP method) and data is retrieved selectively from events with a desired value for the other characteristic as well.

At block 665, domain counter 235 can determine a domain name for each event. Domain counter 235 can then count, for each determined domain name, a number of events identifying access to the domain name at block 670.

It will be appreciated that access counts can refer to webpage posts or mere webpage requests. Thus, in some instances, it is not required that a webpage actually have been presented to a user in order for it to count as an "access". Concentrating on requests can uncover, e.g., security threats that generate malicious webpage requests or modify user-initiated webpage requests. In some instances, whether analyses are performed on requests or posts depends on a value of a setting, which may be set by a client.

Figure 7:
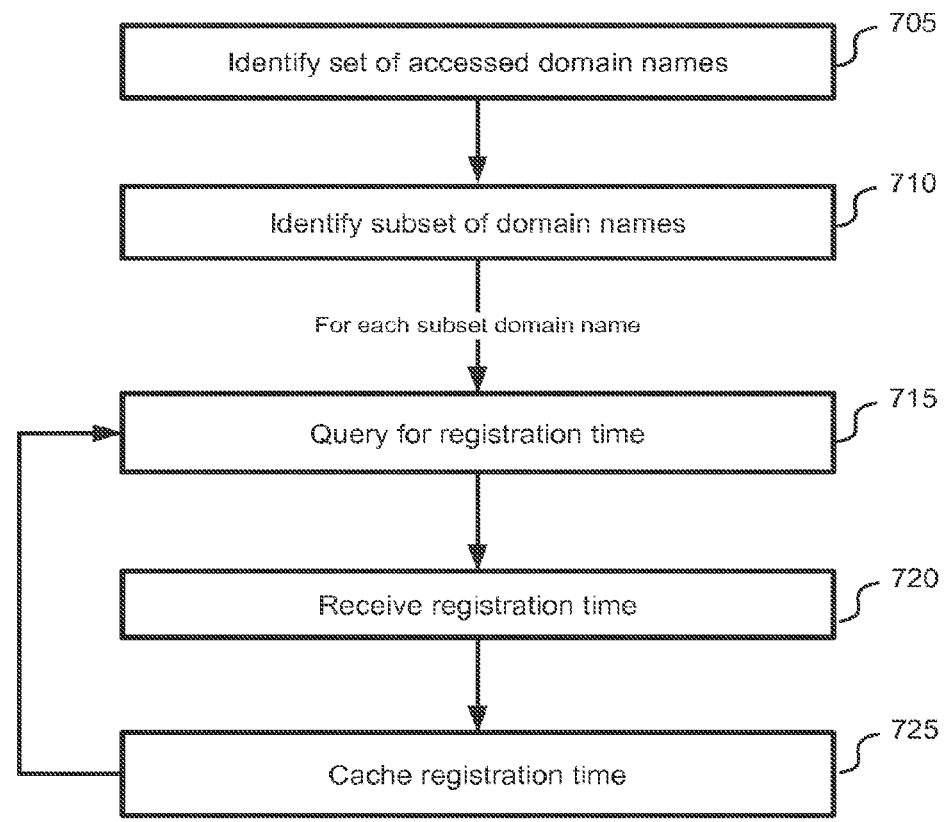
FIG. 7 illustrates a flowchart of an embodiment of a process determining registration times.

Returning to process 500, at block 515, registration identifier 240 determines when one or more domain names were registered with a registrar. FIG. 7 illustrates a flowchart of an embodiment of a process 700 determining registration times. Process 700 begins at block 705 where domain counter 235 identifies a set of accessed domain names. The set of domain names can include, e.g., domain names associated with access times in an identified time period, domain names associated with a particular client and/or domain names associated with another filter (e.g., department identifier).

Domain counter 235 identifies a subset of the set of domain names. The subset can be defined to include only those domain names in the set of domain names for which a criterion is satisfied. For example, a criterion can require that an absolute or relative number of events indicate access to the domain name prior to determining the registration time. As another example, a criterion can require the domain name be one not accessed prior to a time period (e.g., which may be determined by maintaining a data structure associating domain names with a first-observance time) or that a registration time for the domain name be unknown (e.g., absent in a data structure associating domain names to registration times).

For each domain name in the set of domain names, registration identifier 240 can determine when the one or more domain names were registered by sending a request for a registration time of the domain name. The request can be sent to a registry, a registrar or a non-registry and non-registrar source (e.g., an aggregator of registry information that collects registration information from one or more registrars). In one instance, the request is sent to, Internet Corporation for Assigned Names and Numbers. In some instances, multiple registries are queried (e.g., simultaneously or sequentially in a top-down or bottom-up manner until a response is received).

The query can include a request for a time of a specific type of registration or a general registration for the domain. A specific type of registration can include, e.g., an original registration for the domain, a first registration for the domain by a party holding a current registration for the domain, a renewal registration, or a most recent registration for the domain. The specific type of registration can be fixed or determined based on an input (e.g., originating from a client) corresponding to an identification of the type of registration. Registration identifier 240 receives a response to the query at block 720 that includes the registration time. At block 725, registration identifier can store an association of the domain name with the registration time. Such association storage can prevent repeated identical queries. Then, e.g., registration identifier 240 can query a registry or registrar for registration times for some domain names in a set of domain names and utilize stored data to identify registration times for other domain names in the set.

Thus, it will be appreciated that, at block 515 of process 500, one of three registration-time responses may be provided for a given detected domain name: (1) no registration time may be determined based on an estimation that the domain name is not indicative of a security threat (e.g., due to past detection or analysis of the domain name); (2) a registration time may be determined based on a registration time stored in association with the domain name within the security monitoring system 150; or (3) a registration time may be determined by querying an external registry or registrar. It will, however, be appreciated that responses may instead be limited to just one or two of these response times (e.g., always querying a registry).

In some embodiments, age assessor 245 detects select domain names having a relatively recent registration time and a relatively high access count. The detection can be performed based on, e.g., a threshold comparison (e.g., requiring a domain to be associated with an age since registration below a first threshold and an access count above a second threshold in order to be included in the subset; or requiring a domain to be associated with an age-to-access ratio below a threshold to be included in the subset), a model (e.g., requiring an access count to be beyond an expected access range given a registration time) and/or a clustering technique (e.g., requiring an access-count data point to be assigned to an outlier cluster). The detection can be based on a sensitivity parameter (e.g. influencing a threshold or noise-allowance variable) which may be set based on input (e.g., originating from a client) corresponding to the parameter. Detection of the domain names at block 520 may include assigning an expectedness value to each of one or more domain names, where the expectedness value indicates a probability of observing the actual access count given the registration time.

Object generator 250 generates an object representing access counts and registration times at block 525. The object can represent the counts and registration times for all domain names detected at block 505, for only a subset of the detected domain names (e.g., those not accessed prior to a time period of a current analysis) or for only domain names detected at block 520. The object can include a graphic (e.g., scatter plot), data structure (e.g., table) and/or message (e.g., an alert). The object can include an element (e.g., point or row) corresponding to each represented domain name, the element being associating the respective access count with a registration time or age since registration.

Figure 8A:
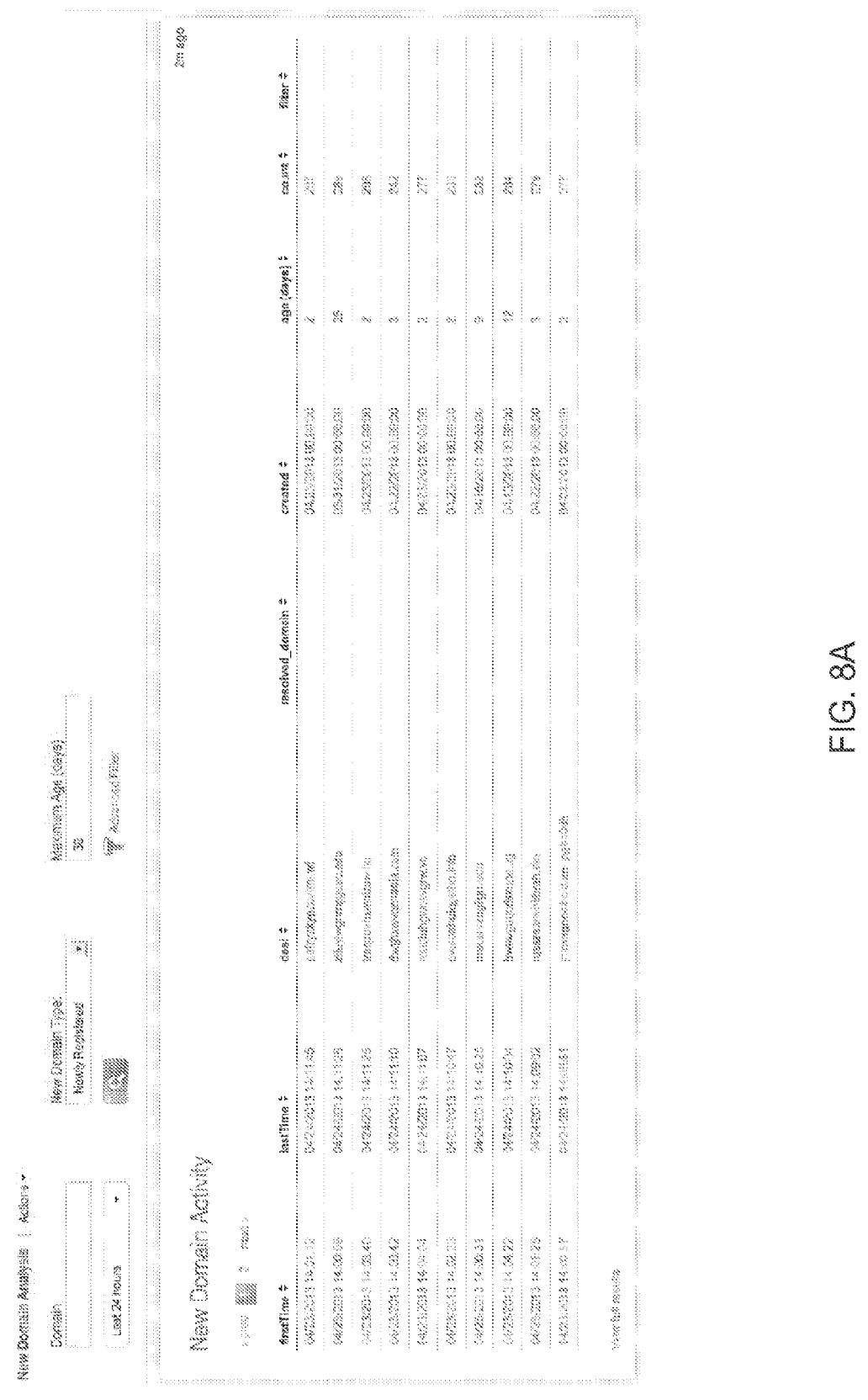
Figures 8B, 8C:

FIGS. 8A-8D show examples of objects representing access counts and registration times. FIG. 8A includes a table, where each row in the table is associated with a domain name. The table lists, for each domain name, a first and last access time. These access times can be absolute (e.g., a first access time determined based on all accessible events) or relative (e.g., a first access time within a defined time window). The table further lists a "created" date, which is identifies the registration time. Based on a current time and the registration time, an age of the domain name is determined and represented. The table lists a number of accesses occurring within a time window being analyzed.

FIG. 8B includes a scatter plot, where each data point in the plot represents a domain name and is positioned to reflect the associated age since the registration time (x-axis) and access counts (y-axis). Thus, points near the y-axis and far from the x-axis may be suspicious, as it may seem unlikely that a new domain name would so quickly garner substantial traffic. FIG. 8C includes a histogram for top-level domains. It will be appreciated, that a similar histogram could be generated that instead relates to unique URLs, rather than top-level domains.

Figure 8D:
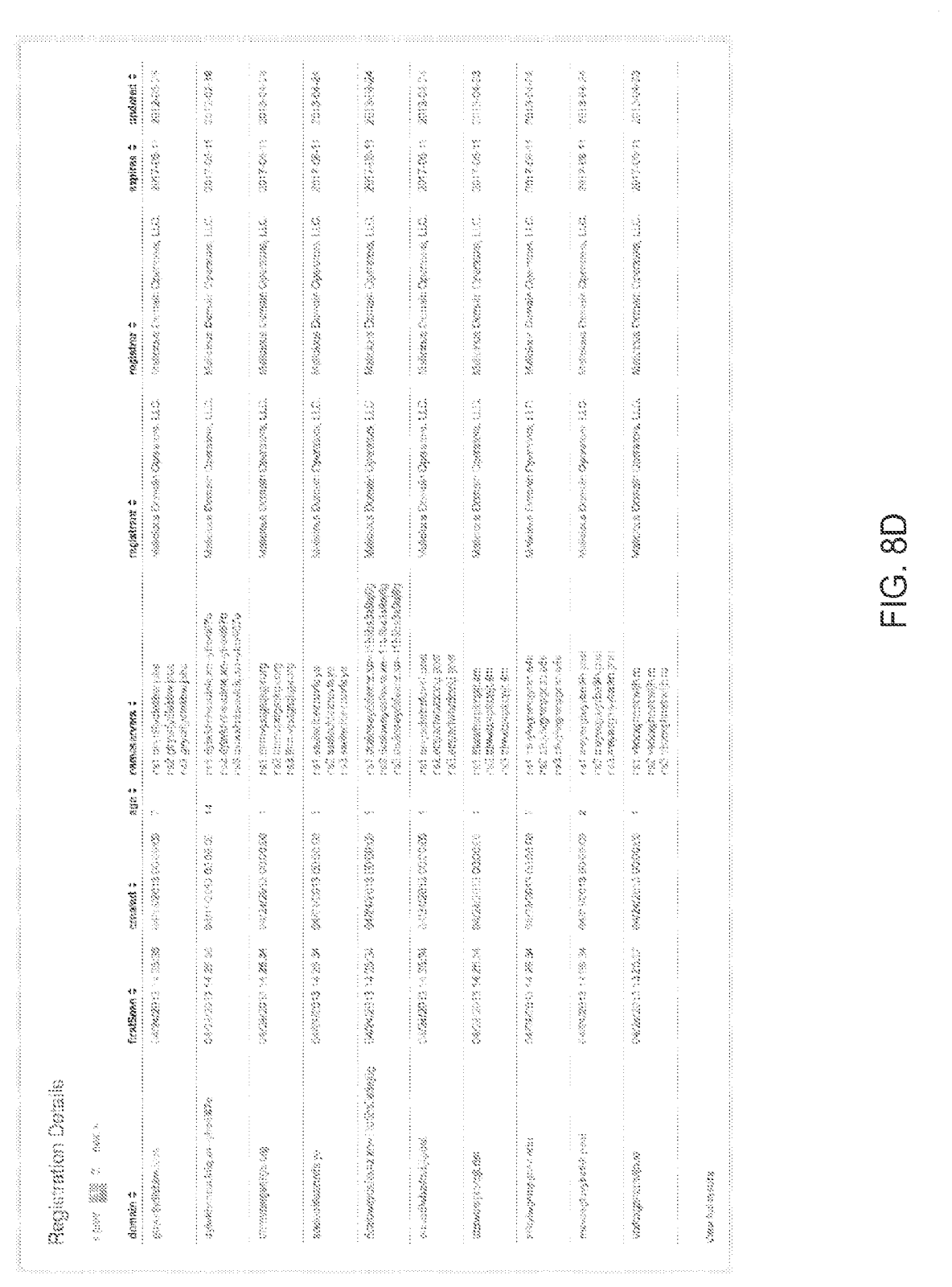

FIG. 8D includes a table, where each row in the table represents a domain name. Each row identifies registration information for the domain name, including an age since registration, name servers, registrant party, registrar name, expiration date for the registration and a date on which the registration was last updated their WHOIS database. Notably, this object does not include an access count. In some instances, the access count can be determined by matching a domain name in the table in FIG. 8D to a domain name in an element in another object identifying the access count. In some instances, the object only represents domain names with supra-threshold access counts, thereby implicating identifying a non-specific access count.

Figure 8E:
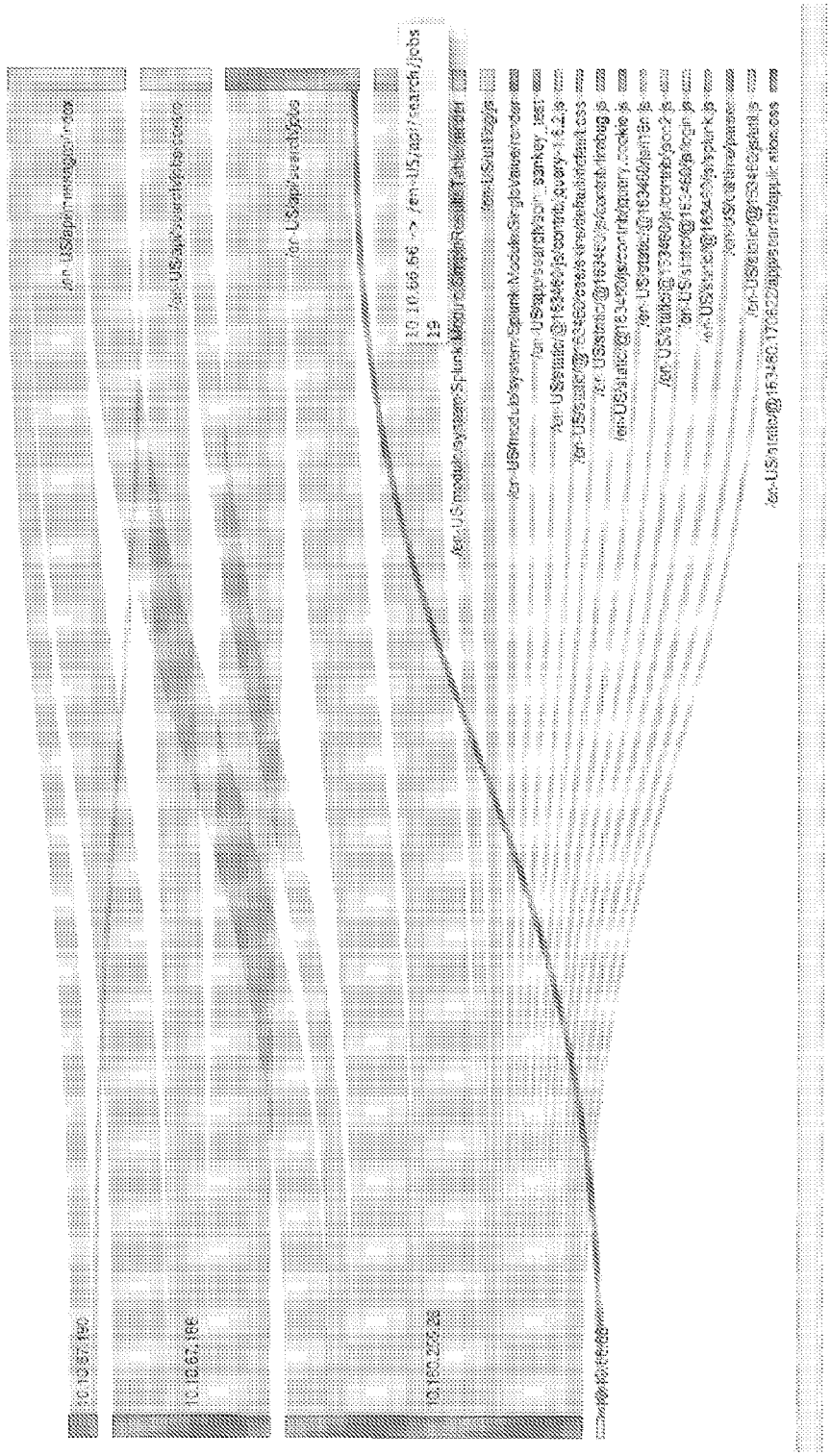
FIG. 8E includes a sankey diagram, which can be used to represent information pertaining to access count and registration times.

FIG. 8E includes a sankey diagram, which can be used to represent information pertaining to access count and registration times. In the depicted instance, client IP addresses are identified on the left side of the diagram, and URLs are identified on the right side of the diagram. The diagram includes a variety of flows—each flowing from an IP address to a URL. A thickness of the depicted flow is representative of a number of times a given IP address accessed a webpage for a given URL. Registration time information can be represented via a third visual characteristic, such as color. In this instance, the color to the right of the URLs is indicative of an age since registration.

Interface engine 225 presents the object (e.g., to a client) at block 530. In some instances, the object is generated and presented upon a detecting an input originating from a client and corresponding to a request for access-count and/or registration-time information. In some instances, the object is generated and presented continuously (e.g., in real-time) or at regular intervals or times.

Object generator 250 modifies the object based on input at block 535. The input can correspond to an identification of types of domain-name accesses a client would like to be analyzed. For example, the input can result in restricting analyses of domain names only to domain names accessed by particular parties, domain names accessed during a particular time period and/or domain names newly registered or observed.

FIG. 8A shows examples of types of received inputs that can be used to modify domain-name analyses and object presentations. For example, a client can select a time period to analyze. In the depicted instance, the time period is set to "Last 24 hours", such that the analysis is tied to domain names accessed in the last 24 hours. Another field ("New Domain Type") allows a client to specify a further restriction where data is only presented in the object for domain names with a recent registration time (e.g., specified by setting the type to "Newly Registered") or for domain names newly observed by the system (e.g., specified by setting the type to "Newly Seen"). What constitutes a "newly" registered or observed domain name can be defined by setting a maximum age. Thus, in the depicted instance, data is only shown for domain names registered in the last 30 days. Finally, the object allows a client to enter a specific domain name of interest. Therefore, a client can quickly identify an access count and registration time for a domain name of interest.

The input initiation object modification at block 535 can also or alternatively correspond to an identification of a level of detail. The input can include, e.g., selecting a domain name (e.g., by clicking on a representation of the domain name), where the selection is indicative of a request for more detail pertaining to the domain name. Upon detecting such input, zoom engine 255 can cause access variables (e.g., counts and times) to be determined with an appropriate level of granularity.

Figure 9:
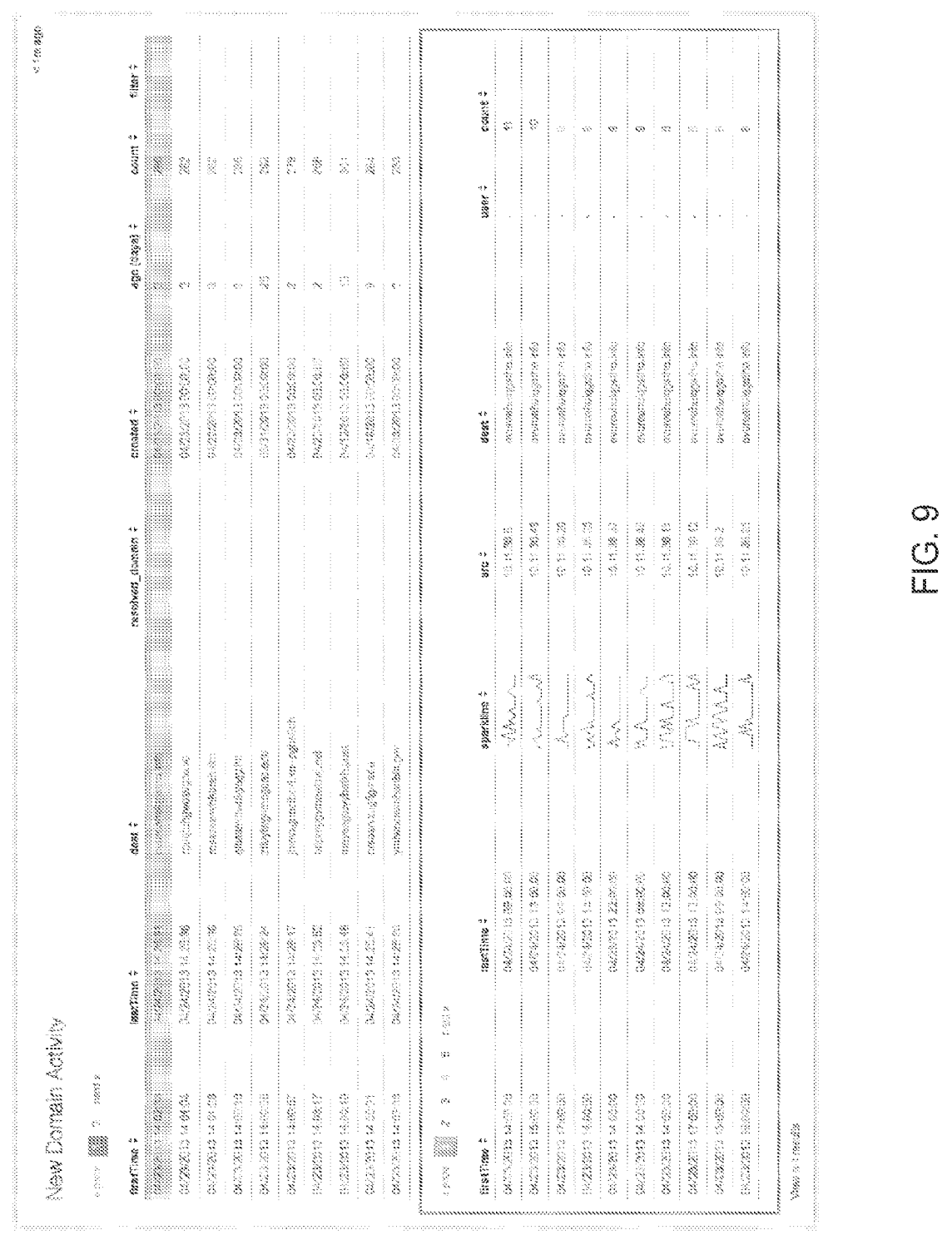

FIG. 9 shows an example of an object with expanded detail relating to a selected domain name. In this example, an input corresponding to a selection of a first-listed domain name triggered a detail table to be presented. The detail table includes elements, each pertaining to the first-listed domain name but corresponding to a different source IP address for the domain name. The detail table identifies an access count and first and last access times for each source. Further, the detail table includes a sparkline that represents a timecourse as to when the accesses to the domain name provided by the particular source occurred.

Figure 10A:
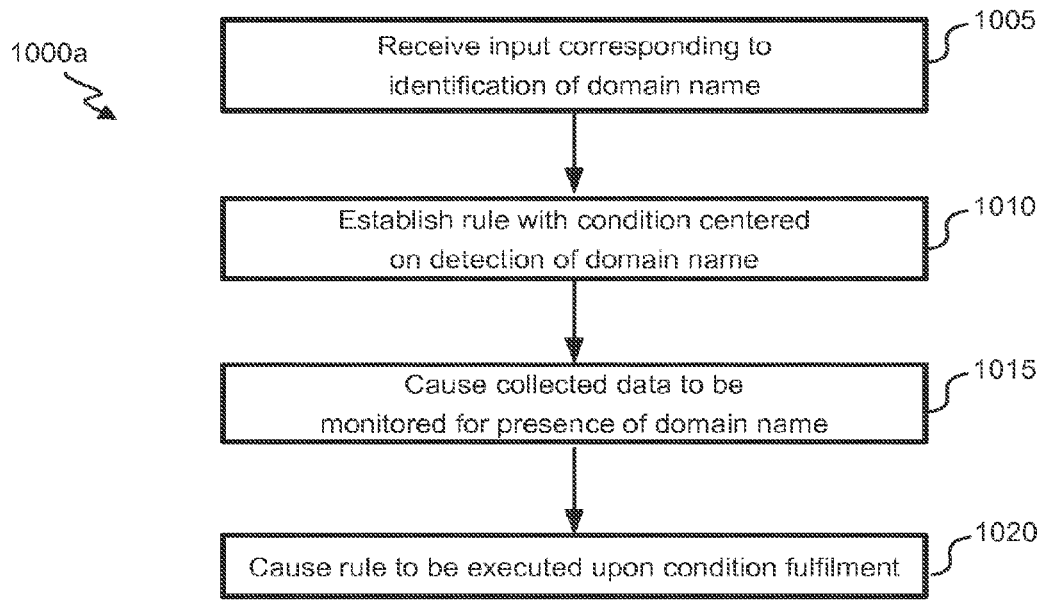
FIGS. 10A and 10B illustrate flowcharts of embodiments of processes for generating a rule pertaining to domain-name detection.
Figure 10B:
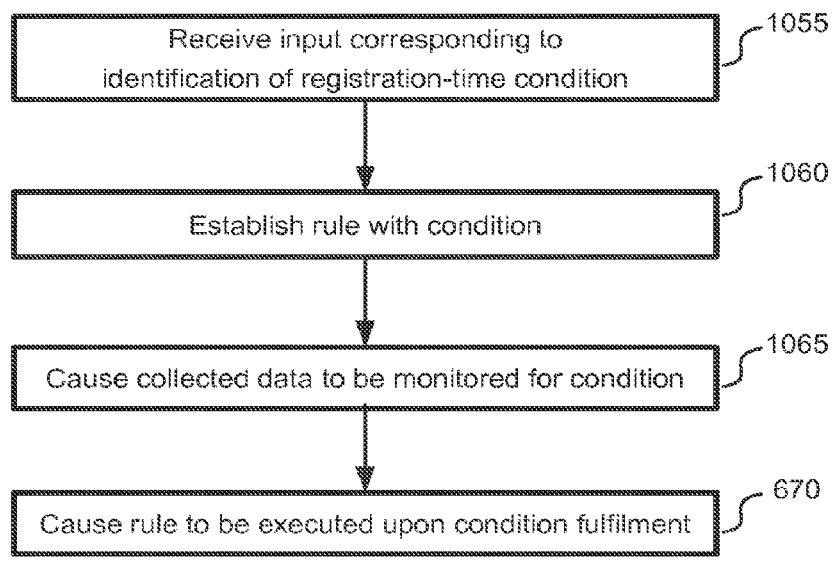

After investigating access and registration details, a client can initiate creation of a rule that can initiate specific actions based on detection of suspicious domain-name access. FIGS. 10A and 10B illustrate flowcharts of embodiments of processes 1000a and 1000b for generating a rule pertaining to domain-name detection. Process 1000a begins at block 1005, where interface engine 225 receives input corresponding to an identification of a domain name. In one instance, a client clicks on a row or point in an object, and the identified domain name is that represented by the row or object. The input may correspond to an indication that the client wishes for a rule to be established based on the domain name. For example, clicking on a point in a scatter plot or an icon in a row in a table may present the client with the opportunity to define the rule. For example, the client may be able to select a consequence of detecting a domain name associated with the selection (e.g., blocking access or causing an alert to be generated and transmitted).

Rule engine 260 establishes a rule with a condition centered on detection of the domain name at block 1010. For example, the condition may include that an event was detected that included a request or post of the domain name. The rule can include an effect that will occur upon detection of condition fulfillment. The effect can be fixed or defined based on the input. Example effects could include blocking access to a webpage or causing an alert to be generated and transmitted that identifies the domain name and attempted access.

Rule engine 260 causes collected data to be monitored for the presence of the domain name at block 1015. For example, request or post HTTP events can be monitored for a URL including the domain name. This monitoring can include real-time extraction of a field value (e.g., a URL) and/or processing of the field value (e.g., to determine the domain name).

Rule engine 260 also causes, at block 1020, the rule to be executed upon detecting the domain name Thus, for example, upon detection of the domain name, an alert may be sent to the client (e.g., including information about the event at issue) identifying the domain name. Other information pertaining to an event triggering the rule (e.g., a client IP address, event timestamp and/or event type) may also be included in the alert. As another example, an action is taken to prevent a user device associated with the event from beginning or continuing to access the domain name.

Process 1000a thus allows a client to examine patterns across access counts and registration ages and to draw from this information to identify suspicious domain names not fitting within the pattern. The client can then establish a rule to limit a system's exposure to the suspicious domain name. This technique draws on the benefit obtainable from evaluating many data points to gain intuition as to which domain names are anomalous but also leaves a client with the flexibility to precisely tailor security measures.

A similar process 1000b shown in FIG. 10B concentrates on a more generalized approach for setting rules. In this instance, rather than receiving input tied to specific domain names, the input is instead related to values of variables, such as access counts and/or registration times. For example, the input can correspond to an indication that access to a domain name should be prevented if it was registered less than a week ago and has an access count greater than 20. Thus, at block 1065, rule engine 260 can cause domain counter 235 to update counts for accesses to specific domain names in real-time, as events are received. In some instances, block 1065 includes generating a value (e.g., a ratio) based on a registration age and access count and comparing the value to a threshold.

Several embodiments disclosed herein indicate that a two-dimensional data object can be generated. For example, a scatter plot can compare an access count to an age since registration. It will be appreciated that, in some instances, the object can represent more than two dimensions. For example, a third dimension can identify a number of client systems having accessed the domain, an average length of a URL or user agent string in events associated with accessing the domain, or a recent acceleration in the access. Such other dimensions could be added in additional table columns. For visual presentations, a scatter plot could be enhanced such that a size, color, texture, and/or animation of individual points represents a value of another dimension.

It will also be appreciated that disclosed embodiments could be extended to allow a client to identify a specific domain name to involved in white- or blacklisting. A client can interact with a dashboard to indicate that a particular domain name is acceptable (e.g., possibly based on his knowledge that internal operations give rise to the value), thereby "whitelisting" the domain name. As a result of the whitelisting, the domain name may be excluded from application of an effect of one or more rules which the domain name may have otherwise been subject to. In some instances, data pertaining to the domain name is also subsequently omitted from objects.

Conversely, a client can interact with a dashboard to indicate that a particular domain name is not acceptable, thereby "blacklisting" the value. Such an action, depending on the embodiment, could cause the blacklisted domain name to always be present in a set of blocked or alert-initiating domain names regardless of rule-condition satisfaction (e.g., to remind the client of its presence and count). In the former case, the blacklisted value may be highlighted relative to other presented values (e.g., in a subset or set) to indicate the confirmed security-concerning characterization of the value.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method, comprising:
   extracting a set of accessed domain names from a set of events by applying a late binding schema to the set of events;
   identifying a respective registration time for each accessed domain name in the set of accessed domain names, wherein the respective registration time is indicative of when the accessed domain name was registered with a registrar or when the accessed domain name was first detected within the set of events;
   identifying a subset of accessed domain names in the set of accessed domain names for which the identified respective registration time of each accessed domain name in the subset is recent relative to times for other accessed domain names in the set of accessed domain names;
   determining, for each accessed domain name in the subset, an access count corresponding to how many times the set of events indicates that the accessed domain name in the subset was accessed;
   causing display of information relating to the access count;
   wherein the method is performed by one or more computing devices.

2. The method of claim 1, further comprising:
   receiving a communication corresponding to an indication as to when each accessed domain name in the subset was registered with a registrar;
   wherein the respective registration time is identified based on the communication.

3. The method of claim 1, further comprising:
   determining that the accessed domain name had not been detected in events generated prior to generation of the set of events;
   wherein the respective registration time is identified based on a time of generation of an event in the set of events that includes the accessed domain name or based on a time included in one or more events in the set of events that includes the accessed domain name.

4. The method of claim 1, wherein the respective registration time comprises an age from a first time when the accessed domain name was registered with the registrar to a current time.

5. The method of claim 1, wherein the display of information comprises at least one of: a graph, a scatter plot, a table, or a message.

6. The method of claim 1, wherein the respective registration time is identified based on a communication received from Internet Corporation for Assigned Names and Numbers (ICANN).

7. The method of claim 1, further comprising:
   identifying a second subset of the set of accessed domain names, wherein a respective registration time for each accessed domain name in the second subset of accessed domain names is within a defined time period, and wherein the second subset includes at least two accessed domain names;
   determining, for each accessed domain name in the second subset, a respective access count corresponding to how many times the set of events indicates that each accessed domain name in the second subset was accessed;
   causing display of simultaneous representations of the respective registration time and the respective access count for each accessed domain name in the second subset.

8. The method of claim 1, further comprising:
   receiving an input corresponding to a selection of a particular identified accessed domain name;
   presenting additional detail pertaining to events in the set of events that included the particular identified accessed domain name.

9. The method of claim 1, further comprising:
   identifying a second subset of the set of accessed domain names, wherein a respective registration time for each accessed domain name in the second subset of accessed domain names is within a defined time period, and wherein the second subset includes at least two accessed domain names;
   determining, for each accessed domain name in the second subset, a respective access count that represents how many times the set of events indicates that the accessed domain name in the second subset was accessed.

10. The method of claim 1, further comprising:
    determining that the access count for a particular accessed domain name in the subset exceeds a threshold number; and
    causing access to the particular accessed domain name in the subset to be blocked.

11. The method of claim 1, wherein an event in the set of events includes unstructured data.

12. The method of claim 1, wherein an event in the set of events includes machine data.

13. The method of claim 1, wherein an event in the set of events includes structured data.

14. The method of claim 1, wherein each accessed domain name in the set of accessed domain names corresponds to an accessed Web page.

15. An apparatus, comprising:
    a subsystem, implemented at least partially in hardware, that extracts a set of accessed domain names from a set of events by applying a late binding schema to the set of events;
    a subsystem, implemented at least partially in hardware, that identifies a respective registration time for each accessed domain name in the set of accessed domain names, wherein the respective registration time is indicative of when the accessed domain name was registered with a registrar or when the accessed domain name was first detected within the set of events;

a subsystem, implemented at least partially in hardware, that identifies a subset of accessed domain names in the set of accessed domain names for which the identified respective registration time of each accessed domain name in the subset is recent relative to times for other accessed domain names in the set of accessed domain names;

a subsystem, implemented at least partially in hardware, that determines, for each accessed domain name in the subset, an access count corresponding to how many times the set of events indicates that the accessed domain name in the subset was accessed;

a subsystem, implemented at least partially in hardware, that causes display of information relating to the access count.

16. The apparatus of claim 15, further comprising:

a subsystem, implemented at least partially in hardware, that receives a communication corresponding to an indication as to when the accessed domain name in the subset was registered with a registrar;

wherein the respective registration time is identified based on the communication.

17. The apparatus of claim 15, wherein the respective registration time comprises an age from a first time when the accessed domain name was registered with the registrar to a current time.

18. The apparatus of claim 15, wherein the display of information comprises at least one of: a graph, a scatter plot, a table, or a message.

19. The apparatus of claim 15, further comprising:

a subsystem, implemented at least partially in hardware, that identifies a second subset of the set of accessed domain names, wherein a respective registration time for each accessed domain name in the second subset of accessed domain names is within a defined time period, and wherein the second subset includes at least two accessed domain names;

a subsystem, implemented at least partially in hardware, that determines, for each accessed domain name in the second subset, a respective access count corresponding to how many times the set of events indicates that each accessed domain name in the second subset was accessed;

a subsystem, implemented at least partially in hardware, that causes display of simultaneous representations of the respective registration time and the respective access count for each accessed domain name in the second subset.

20. The apparatus of claim 15, further comprising:

a subsystem, implemented at least partially in hardware, that receives an input corresponding to a selection of a particular identified accessed domain name;

a subsystem, implemented at least partially in hardware, that presents additional detail pertaining to events in the set of events that included the particular identified accessed domain name.

21. The apparatus of claim 15, further comprising:

a subsystem, implemented at least partially in hardware, that determines that the access count for a particular accessed domain name in the subset exceeds a threshold number; and a subsystem, implemented at least partially in hardware, that causes access to the particular accessed domain name in the subset to be blocked.

22. The apparatus of claim 15, wherein an event in the set of events includes at least one of: unstructured data, machine data, or structured data.

23. A non-transitory computer-readable medium storing one or more sequences of instructions, wherein execution of the one or more sequences of instructions by one or more processors causes the one or more processors to perform:

extracting a set of accessed domain names from a set of events by applying a late binding schema to the set of events;

identifying a respective registration time for each accessed domain name in the set of accessed domain names, wherein the respective registration time is indicative of when the accessed domain name was registered with a registrar or when the accessed domain name was first detected within the set of events;

identifying a subset of accessed domain names in the set of accessed domain names for which the identified respective registration time of each accessed domain name in the subset is recent relative to times for other accessed domain names in the set of accessed domain names;

determining, for each accessed domain name in the subset, an access count corresponding to how many times the set of events indicates that the accessed domain name in the subset was accessed;

causing display of information relating to the access count;

wherein the method is performed by one or more computing devices.

24. The non-transitory computer-readable medium of claim 23, further comprising:

receiving a communication corresponding to an indication as to when each accessed domain name in the subset was registered with a registrar;

wherein the respective registration time is identified based on the communication.

25. The non-transitory computer-readable medium of claim 23, wherein the respective registration time comprises an age from a first time when the accessed domain name was registered with the registrar to a current time.

26. The non-transitory computer-readable medium of claim 23, wherein the display of information comprises at least one of: a graph, a scatter plot, a table, or a message.

27. The non-transitory computer-readable medium of claim 23, further comprising:

identifying a second subset of the set of accessed domain names, wherein a respective registration time for each accessed domain name in the second subset of accessed domain names is within a defined time period, and wherein the second subset includes at least two accessed domain names;

determining, for each accessed domain name in the second subset, a respective access count corresponding to how many times the set of events indicates that each accessed domain name in the second subset was accessed;

causing display of simultaneous representations of the respective registration time and the respective access count for each accessed domain name in the second subset.

28. The non-transitory computer-readable medium of claim 23, further comprising:

receiving an input corresponding to a selection of a particular identified accessed domain name;

presenting additional detail pertaining to events in the set of events that included the particular identified accessed domain name.

29. The non-transitory computer-readable medium of claim 23, further comprising:
   determining that the access count for a particular accessed domain name in the subset exceeds a threshold number; and
   causing access to the particular accessed domain name in the subset to be blocked.

30. The non-transitory computer-readable medium of claim 23, wherein an event in the set of events includes at least one of: unstructured data, machine data, or structured data.

* * * * *